Figure 1:
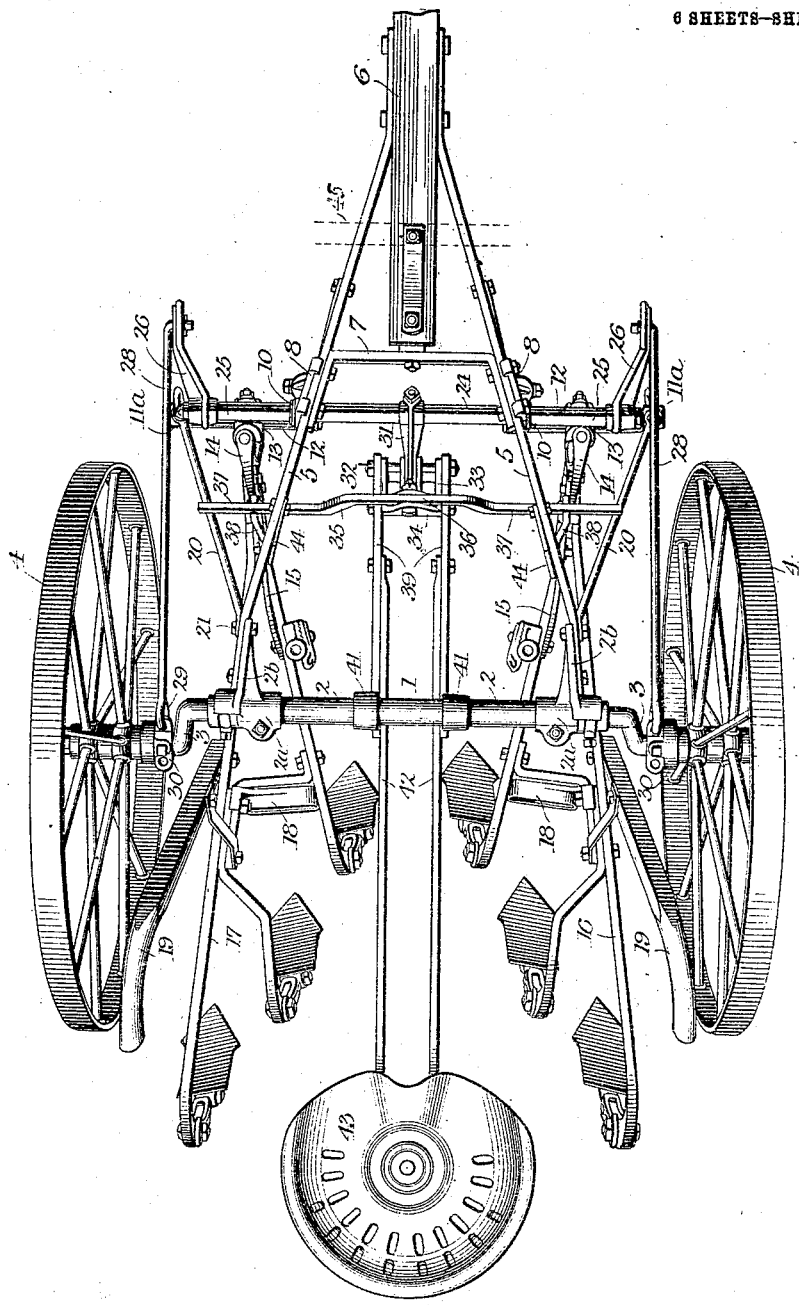

A. C. LINDGREN.
WHEELED CULTIVATOR.
APPLICATION FILED JULY 9, 1909.

1,054,698.

Patented Mar. 4, 1913.
6 SHEETS—SHEET 4.

A. C. LINDGREN.
WHEELED CULTIVATOR.
APPLICATION FILED JULY 9, 1909.

1,054,698.

Patented Mar. 4, 1913.
6 SHEETS—SHEET 5.

Witnesses
Raymond F. Barnes
James Atkins

Inventor
Alexus C. Lindgren
by P. T. Dodge
Attorney

A. C. LINDGREN.
WHEELED CULTIVATOR.
APPLICATION FILED JULY 9, 1909.

1,054,698.

Patented Mar. 4, 1913.
6 SHEETS—SHEET 6.

Witnesses
Raymond F Barnes.
James Atkins

Inventor
Alexus C Lindgren
by P. J. Dodge
Attorney

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

WHEELED CULTIVATOR.

1,054,698.  Specification of Letters Patent.  Patented Mar. 4, 1913.

Application filed July 9, 1909. Serial No. 506,855.

*To all whom it may concern:*

Be it known that I, ALEXUS C. LINDGREN, of Moline, county of Rock Island, and State of Illinois, have invented a new and useful Improvement in Wheeled Cultivators, of which the following is a specification.

This invention relates to wheeled cultivators.

The object of the invention is to produce a cultivator in which the weight of the operator is utilized to counterbalance the weight of the cultivator beams, and thereby provide an effective means for readily positioning said beams and also for automatically balancing the frame of the machine, the latter feature resulting from simultaneously moving the ground wheels rearward to shift the center of gravity when the beams are raised into inactive position. By my improved construction, the usual depth regulating lever mechanism and springs may be dispensed with, the depth being entirely regulated by the automatic adjustment of the parts.

In wheeled cultivators as heretofore constructed, after the draft tongue has been properly balanced, while at work, by adjusting the height of the hitch on the seat bar, it has been found that, when the beams are raised away from the ground, the tongue will tend to tilt upwardly, due to the added weight of the raised beams with the center of gravity remaining unchanged. To avoid this and to effect a shifting of the center of gravity, it is necessary to move the wheels rearwardly relative to the tongue, and such movement must be effected simultaneously with the raising of the beams. In my improved cultivator, this desirable result is accomplished readily and automatically.

To this end, the invention consists of mechanism of improved form, construction, and arrangement, all under the absolute control of the operator, and by means of which the cultivator beams are counterbalanced and the ground wheels positioned with reference to the frame of the machine so as to change the center of gravity and thereby properly balance the cultivator beams; in the one case, when the beams are raised, preventing the pole from tilting upward, and, in the other case, when the beams are lowered into position for action, avoiding the tendency of the draft to pull the pole downward and thereby subject the animals to neck-weight.

The invention also resides in the details of construction hereinafter described and claimed.

Figure 2:
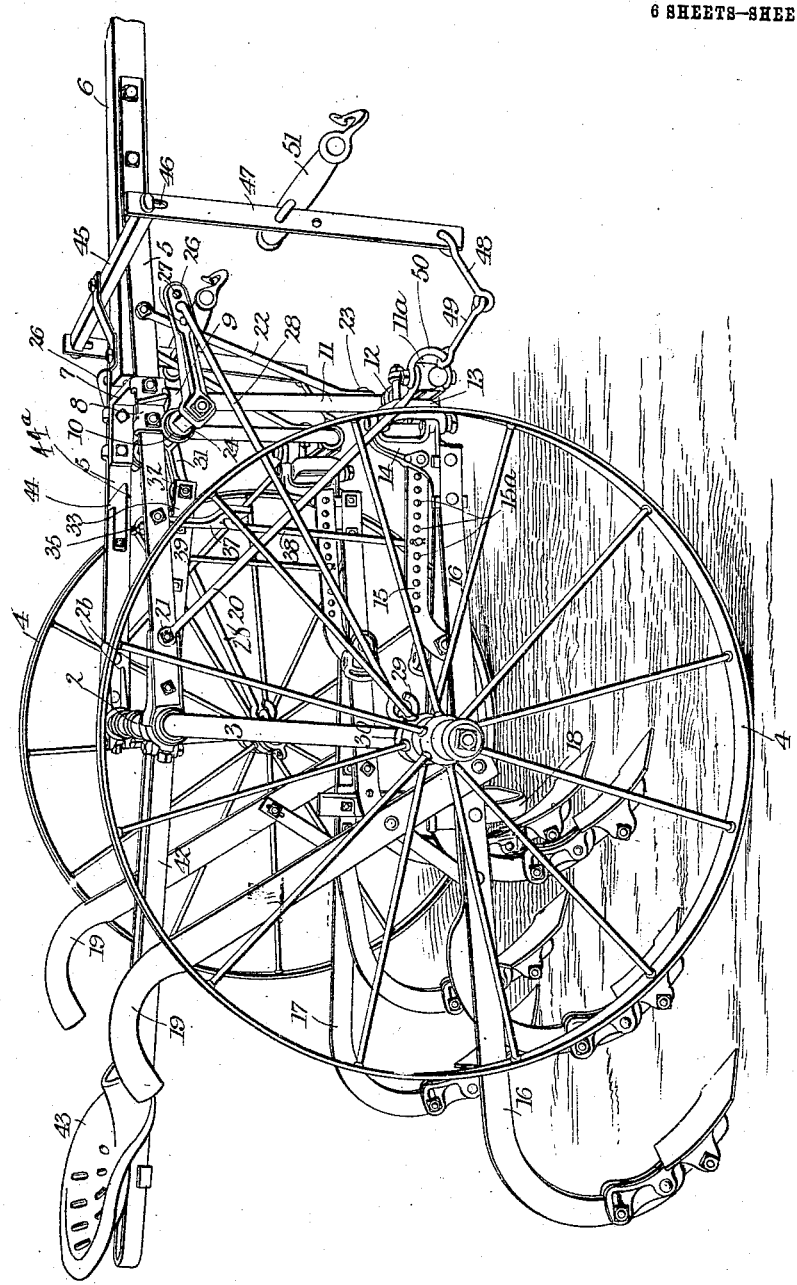
Figure 3:
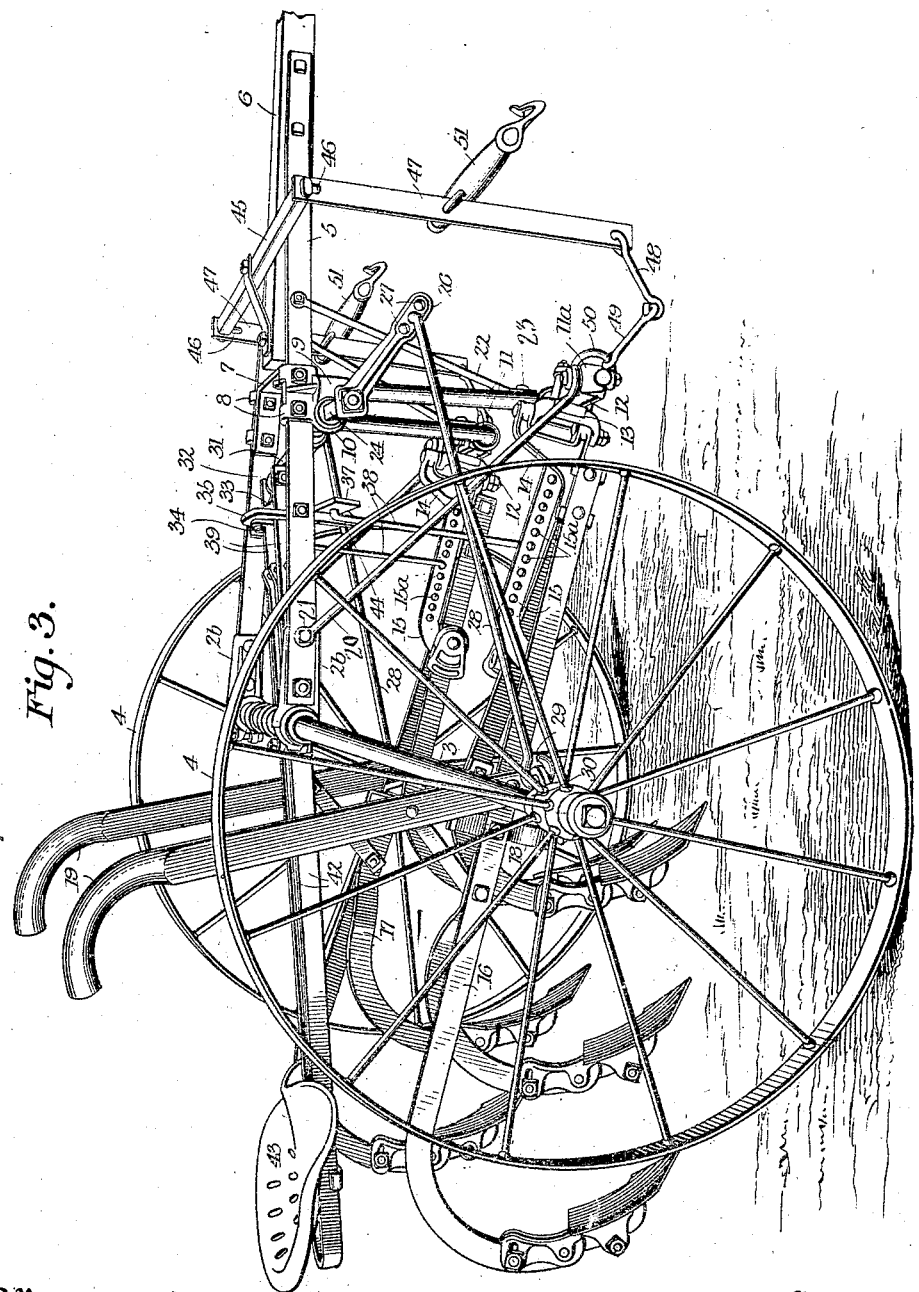
Figure 4:
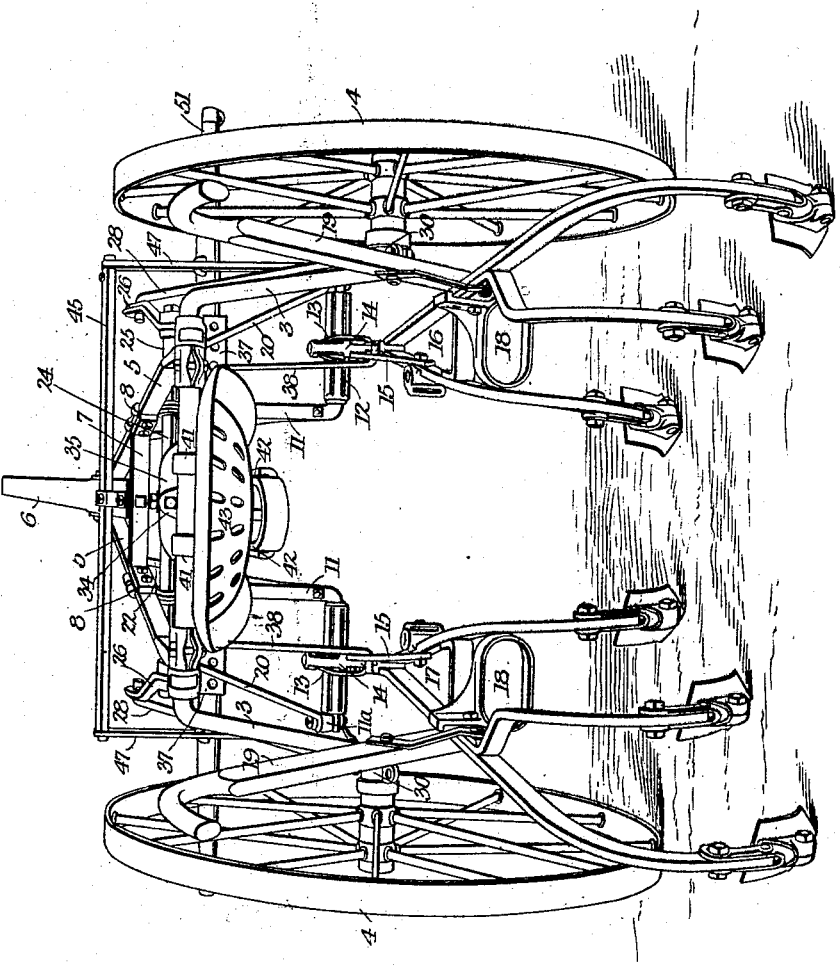
Figure 5:
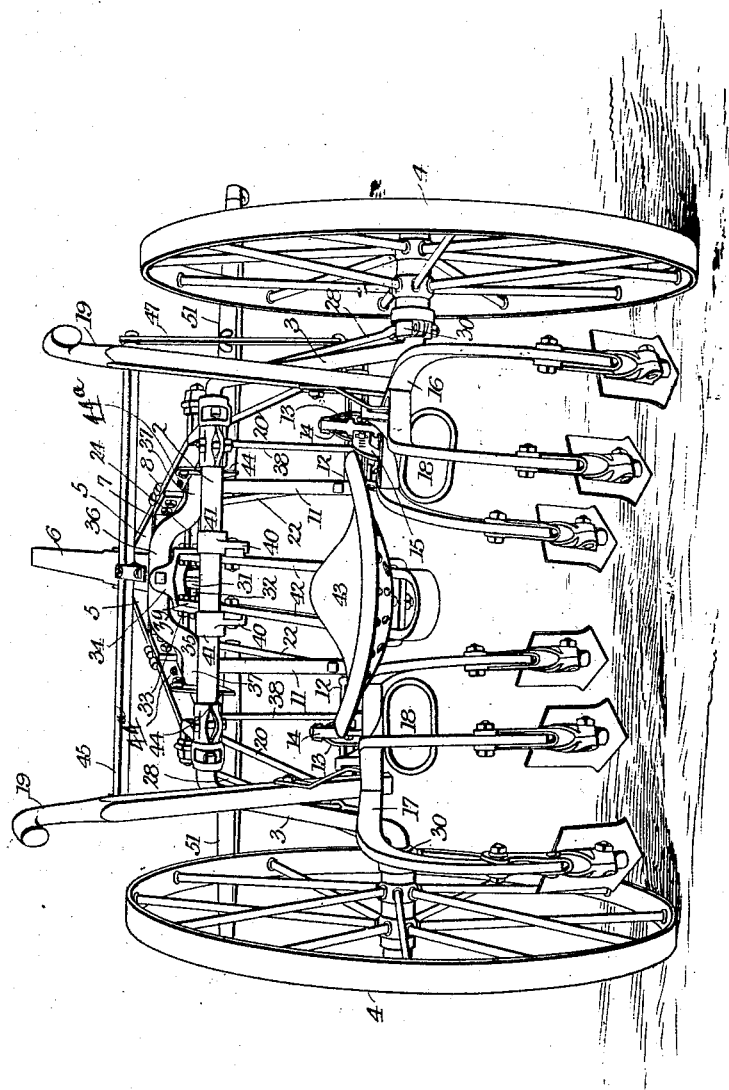
Figure 6:
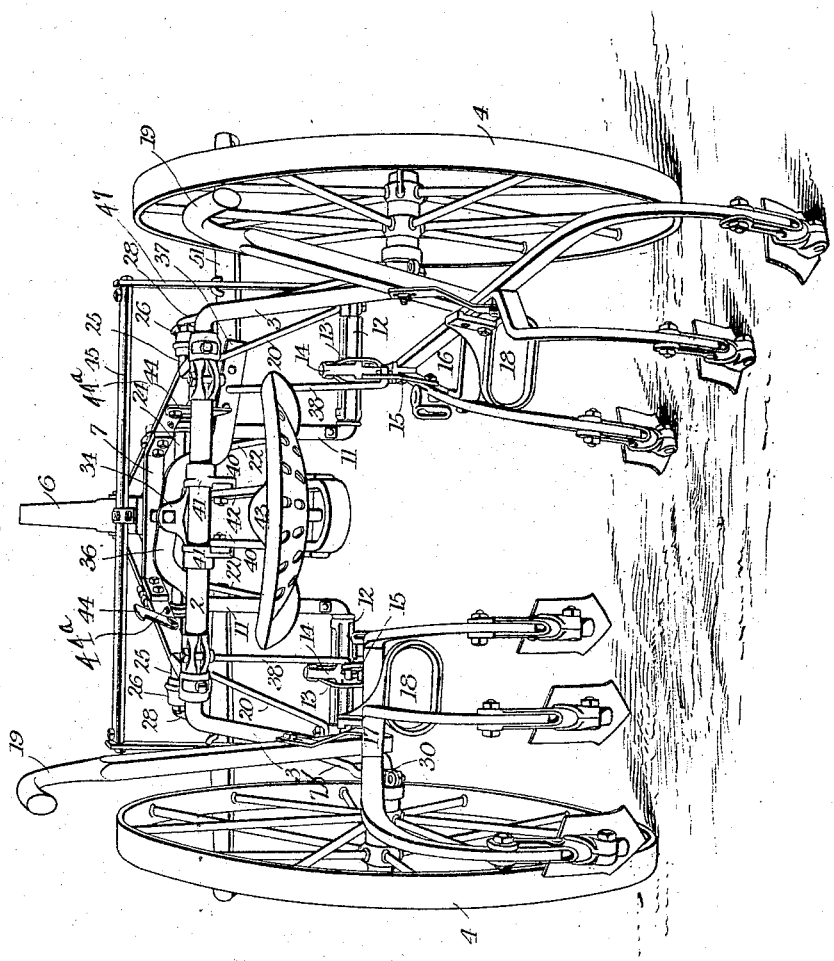

In the accompanying drawings:—Figure 1 is a top plan view of a wheeled cultivator embodying my invention. Fig. 2 is a perspective view thereof showing both of the two cultivator beams down, that is, in their lowered position for action. Fig. 3 is a similar view, with the beams shown as occupying their raised or inactive position. Fig. 4 is a rear view showing both of the beams down and in active position. Fig. 5 is a similar view with the beams shown as raised and inactive. Fig. 6 is a similar view showing one beam down and active and the other raised and inactive.

Referring to the drawings:—The numeral 1 designates a supporting axle-member of the machine, comprising a central arched portion 2 and two vertical portions 3, the lower ends of said portions being bent and formed as wheel spindles on which the ground wheels 4 are mounted. At each side of the arched portion 2 of the axle-member are sleeves 2ª which encircle said portion, and from each of which extends a bar-supporting lug 2ᵇ. To these lugs are suitably secured two frame-bars 5. These bars extend forward and converge to the point where they are bolted to the sides of a draft-tongue 6. The tongue is further secured at its rear end to a cross-bar 7 which occupies a permanent position between and is secured to the sides of said frame-bars 5. These parts constitute the frame of the machine and, in the main, support the principal parts of the machine now to be described.

Suitably mounted on the frame-bars 5, intermediate of their connection with the axle-member and the draft-tongue, are depending brackets 8, each having a downwardly extending stem 9 and a rearwardly extending lug 10. Suitably secured in each of the stems 9 is an angular hanger 11, the lower portion of which is bent at right angles to its vertical portion and carries a squared bearing member 12. Clipped to said member 12 is a block 13 to provide a vertical axis for a yoked member 14, to which is secured a rearwardly extending arm 15, the rear portion of which is curved downwardly and is suitably connected to one of the side bars of cultivator beams 16 and 17. It is to be understood that the construction just described constitutes the support for the forward end of each of the beams and, likewise, the fulcrum therefor when said beams are raised and lowered in the manner presently to be explained.

On each of the beams is suitably mounted a stirrup 18 and an upwardly extending handle 19 for facilitating the positioning of the beams by the driver.

To afford requisite rigidity to the beam-supporting hangers 11 when the beams are being positioned, a brace rod 20 may be connected at its lower end to a block 11ª mounted on the outer extremity of the hanger 11 and at its upper end to the side of the frame bar, as at 21 (Figs. 2 and 3). A second brace rod 22 is secured at its lower end to the hanger 11, as at 23, and to the side of the frame bar 5 at a point forward of the attachment thereto of the bracket 8.

Suitably supported in the aforementioned lugs 10 on the brackets 8 is a square rock-shaft 24, the ends 25 of which extend beyond the said brackets and have attached thereto swinging arms 26 provided with a series of alined holes 27, into one or another of which projects the bent end of a wheel positioning rod 28. These rods (at each side of the machine) extend rearwardly and downwardly from said arms and have hooked ends 29 connected to collars 30 which encircle the wheel spindles contiguous to the ground wheels, as clearly appears in Fig. 1. The holes 27 in the arm 26 afford a convenient means for changing the extent of movement of the wheel positioning rods 28. It will be understood that when the rock-shaft is rotated (by means of mechanism presently to be described), it will cause the arms 26 to swing upwardly or downwardly (as the case may be) and thereby move the wheel positioning rods 28 to force the ground wheels rearward (as shown in Fig. 3) or draw them forward (as shown in Fig. 2). When the cultivator is traveling forward, the wheels may encounter uneven or rough surfaces. The tendency would then be to draw the same rearward with variable degrees of power, and were this to occur and the parts be permitted to actuate the rock-shaft, it would affect the balance of the beams,—raising the forward end of the seat-bar and thereby tend to force the beams upward and the driver downward. But, by arranging the swinging arms 26 in a position to extend forward and having the connecting rod practically at the position of dead center as shown in Fig. 2, any such action would have little or no effect upon said rod, and the parts would be maintained in proper operative position. The mechanism which actuates said rock-shaft and which primarily is the beam and wheel positioning mechanism of the machine, constitutes an important feature of the invention and will now be described.

Fixed upon the rock-shaft at its central portion is a rearwardly projecting arm 31, which is slotted at its extended end, and in the slot is a transverse bolt 32 carried on the forward ends of two rearwardly extending bars 39 which pin forms a means of slidable connection between said arm and a fulcrum member 33 carried by the said bars 39. This fulcrum member has formed on it a vertical bifurcated portion 34, between the bifurcations of which is fulcrumed, on a horizontal longitudinal axis, a transverse rocking member 35 comprising an arched central portion 36 and oppositely extending portions 37. These last-mentioned portions are provided with a number of holes, into one or another of which projects the upper bent end of a lifting-rod 38, the lower end of which is inserted in one of the holes 15ª in the arm 15. The rocking member and its hangers 38 operate to raise or lower the beams, the same being fulcrumed on the hangers 11, as already described; and these parts are so arranged and related that both of said beams may be raised simultaneously (in the event that the rocking member 35 is bodily elevated, as will presently appear); or one of the beams may be positioned independently of the other in the event that the member 35 is merely rocked on its horizontal axis. The bars 39 alluded to extend rearwardly and are fixed to lugs 40, 40, depending from collars 41, 41 mounted loosely on the arched portion of the axle member, and to the bars 39, 39, are connected the forward ends of two bars 42, 42, which extend rearwardly beyond the axle of the machine and give support at their rear ends to a driver's seat 43. The bars 39, 39 and 42, 42 thus arranged, constitute conjointly a supporting member fulcrumed on the axle, the forward end of which gives support to the fulcrum member 33 and is operatively connected with the rock-shaft 24.

It is now to be understood that the movement of the seat-frame effects a vertical movement of the fulcrum member 33 to operate the arm 31 which, by reason of its being fixed on the rock-shaft, rocks said shaft. This movement of the shaft swings the arms 26 to move the wheel positioning rods and the wheels, as heretofore explained. Simultaneously with the raising of the fulcrum member 33 and (in consequence) of the vertical actuation of the rocking member 35 (constituting the beam positioning mechanism, already referred to) and the upward movement of the lifting rods, the beams are swung on their fulcrums at their forward ends and relatively positioned. The seat frame therefore performs the function of raising or lowering the fulcrum member 33, thereby moving the rocking members 35, the lift-rods 38, and the beams; at the same time, and by reason of the connection of the seat frame with the rock-shaft 24, the latter will be operated and thereby the swinging arms thereon will actuate the wheel-positioning rods, forcing the wheels forwardly or rearwardly, as the case may be, to change the center of gravity of the frame.

Movement of the seat frame is effected by the driver (whose weight is so disposed relative to the parts of the machine in advance of the axle-member that it counterbalances the weight of such parts), who with his feet, presses on the beams, whereupon just that much weight is removed from the seat-frame and, thereby, the beams quickly respond to the actuating movement thus initiated. Of course, when the driver lifts the beams, the reverse action occurs. It will have been understood that by reason of the rearward movement of the wheels at the same time the beams are raised, the center of gravity is correspondingly changed and thereby the balancing of the frame of the machine on its supporting structure is automatically effected. It will have been understood, also, that when the rocking member 35 is rocked on its fulcrum, one or the other of its ends will be raised and, consequently, the beam (which by the lifting rod connects therewith) will be raised. By this means, therefore, I provide for the positioning of the beams independently of each other, as shown in Fig. 6.

The operation of the entire structure will now be understood: Assuming that both beams are in their raised, inactive position, that is, as they appear in Figs. 3 and 5, and that the operator desires to position them into active position, and assuming, also, that he is seated on the seat, his weight will be disposed to the rear of the fulcrum of the seat-supporting frame which, then, will occupy an inclined position, as shown in Fig. 3, the seat will occupy a plane below the horizontal plane of the arched portion of the axle-member, and the vertical portions of the axle-member will be inclined rearwardly, as shown in said figure. If he then pushes the beams downwardly, his weight, in counterbalancing that of the parts forward of the axle-member, will permit these parts to be actuated in the manner already described, and the vertical portions of the axle-member will have changed from the inclined position shown in Fig. 3 to the upright position shown in Fig. 2, which operation throws the wheels forward, the center of gravity is shifted, and the frame of the machine becomes properly balanced.

Pivoted on the inner faces of the frame-bars 5 are latches 44, the lower hook-ends of which are adapted to engage the ends of the rocking member 35 and thereby retain the beams in their raised position. When the operator desires to dismount and still have the beams raised, these latches are turned rearward, thereby letting them hang downward and ready to engage the rocking member 35 as soon as it is raised upward when the rear end of the seat-frame is pressed downward. These hold the beams raised for transportation, etc. When the beams are in their active position, the latches may be turned back to rest upon a pin 44ª inserted in the frame-bar.

The series of holes in the arm 15 affords a means of adjusting the structure for different weights of different drivers. By inserting the hanger toward the forward end of the arm, the machine is adjusted for heavy operators, and when toward the rear end of said arm, the machine is adjusted for light operators.

The series of holes in the rocker-arm 35 are for the purpose of permitting different lateral coupling of the beams for wide or narrow rows.

Pivoted on the upper side of the tongue, somewhat in advance of its rear end, is a cross-piece 45, the ends of which project into slots 46 in the upper end of vertical hangers 47. To the lower end of each of these hangers is connected a link 48 which in turn connects with a second link 49 secured to the clip 50 carried by the block-member on the arched hanger. Suitably secured to the hangers are swingletrees 51. By this arrangement, no matter what may be the position or movement of the beams, the tongue and draft devices are unaffected and remain in practically the same horizontal position, thereby relieving the strain on the draft horses which would ensue if the tongue tipped or lowered when the weight of the bars is being shifted.

By operating the parts as herein set forth, and effecting positioning of the beams in the manner described, I am enabled to dispense with the usual lever mechanisms and springs with their attendant weight, etc.

While I have in the foregoing described the details of my invention, yet it is to be understood that my invention is not limited to such details except in so far as such limitations are specified in the claims.

Having thus described my invention, what I claim as new and desire to secure by Letters Patent is:—

1. In a wheeled cultivator, the combination of a supporting-frame, a relatively stationary beam-fulcrum-member sustained by said frame, a cultivator-beam fulcrumed at its forward end on said member, a counterbalancing seat-bar pivotally mounted on said frame, a connection between the seat-bar and beam whereby the latter is tilted on its fulcrum by the seat-bar, and means operated by the seat-bar for shifting the center of gravity of said frame to balance the same.

2. In a wheeled cultivator, the combination of a supporting-frame, a cultivator-beam sustained by said frame, shiftable ground-wheels sustaining said supporting-frame, a shiftable seat-member sustained by said frame and operating to counterbalance said beam, beam and wheel positioning means mounted on said frame and connecting with said beam and wheels, and mechanism connecting with the seat-member for operating said positioning means.

3. In a wheeled cultivator, the combination of a supporting frame, cultivator beams movably supported by said frame, ground wheels for sustaining said frame, an axle member upon which said wheels are mounted, a swinging seat bar fulcrumed intermediate of its length connections between the seat bar and beams adapted when the seat bar is swung on its fulcrum to effect a counterbalancing of said beams, and means connecting with said seat bar and ground wheels for effecting a balancing of said supporting frame coincident with the movement of the cultivator beams.

4. In a wheeled cultivator, the combination of a supporting frame, cultivator beams supported on said frame, ground wheels for supporting said frame and shiftable in the line of draft, an oscillating seat bar supported by said frame, connections between said beams and seat bar and additional connections between said seat bar and said wheels whereby, by the oscillation of the seat bar, the weight imposed thereon effects a counterbalancing of the beams, and the wheels are simultaneously shifted in the line of draft.

5. In a wheeled cultivator, the combination of a supporting frame, cultivator beams supported thereby, ground wheels for sustaining said frame and shiftable in the line of draft, an oscillating seat bar fulcrumed on said frame, wheel positioning means and jointed connections between the wheel positioning means and seat bar to balance said frame.

6. In a wheeled cultivator, the combination of a supporting frame, cultivator beams supported thereby, ground wheels for sustaining said frame and shiftable in the line of draft, an oscillating seat bar fulcrumed on said frame, wheel positioning means connecting with and operated by said seat bar to balance said frame, beam positioning means and connections between the latter and said seat bar.

7. In a wheeled cultivator, the combination of a supporting frame, cultivator beams supported thereby, ground wheels for sustaining said frame and shiftable in the line of draft, an oscillating seat bar fulcrumed on said frame, wheel positioning means connecting with and operated by said seat bar to balance said frame, beam positioning means also connecting with and operated by said seat bar, one of said positioning means including a rocking member for actuating said positioning means.

8. In a wheeled cultivator, the combination of a supporting frame, cultivator beams supported thereby, ground wheels for sustaining said frame and shiftable in the line of draft, an oscillating seat bar fulcrumed on said frame, wheel positioning means connecting with and operated by said seat bar to balance said frame, beam positioning means also connecting with and operated by said seat bar, said positioning means including a rocking member and an actuating arm connected with and operated by the rocking member.

9. In a wheeled cultivator, the combination of a supporting frame, cultivator beams supported thereby, ground wheels for sustaining said frame and shiftable in the line of draft, an oscillating seat bar fulcrumed on said frame, wheel positioning means connecting with and operated by said seat bar to balance said frame, beam positioning means also connecting with and operated by said seat bar, said positioning means including a rocking member, an actuating arm connected with and operable to actuate said rocking member, and swinging arms carried and moved by said rocking member.

10. In a wheeled cultivator, the combination of a supporting frame, cultivator beams supported thereby, ground wheels for sustaining said frame and shiftable in the line of draft, an oscillating seat bar fulcrumed on said frame, wheel positioning means connecting with and operated by said seat bar to balance said frame, beam positioning means also connecting with and operated by said seat bar, said positioning means including a rocking member, an actuating arm connecting with and operable to actuate said rocking member, and a rising and falling fulcrum member connecting with said actuating arm.

11. In a wheeled cultivator, the combination of a supporting frame, cultivator beams supported thereby, ground wheels for sustaining said frame and shiftable in the line of draft, an oscillating seat bar fulcrumed on said frame, wheel positioning means connecting with and operated by said seat bar to balance said frame, beam positioning means also connecting with and operated by said seat bar, said positioning means including a rocking member, an actuating arm connecting with and operable to actuate said rocking member, a rising and falling fulcrum member connecting with said actuating arm, and an oscillating beam lifting member carried by said fulcrum member.

12. In a wheeled cultivator, the combination of a supporting frame, cultivator beams supported thereby, ground wheels for sustaining said frame and shiftable in the line of draft, an oscillating seat bar fulcrumed on said frame, wheel positioning means connecting with and operated by said seat bar to balance said frame, beam positioning means also connecting with and operated by said seat bar, said positioning means including a rocking member, an actuating arm connecting with and operable to actuate said rocking member, a rising and falling fulcrum member connecting with said actuating arm, an oscillating beam lifting member carried by said fulcrum member, and latching members engaging said lifting member.

13. In a wheeled cultivator, the combination of a supporting frame, cultivator beams supported thereby, ground wheels for sustaining said frame and shiftable in the line of draft, an oscillating seat bar fulcrumed on said frame, wheel positioning means connecting with and operated by said seat bar to balance said frame, beam positioning means also connecting with and operated by said seat bar, said positioning means including a rocking member, and means for adjusting the movement of said positioning means.

14. In a wheeled cultivator, the combination of a supporting frame, shiftable ground wheels sustaining the same, cultivator beams pivotally connected to the frame, a seat bar fulcrumed on the frame, operative connections between the seat bar and beams for balancing the latter, and operative connections between the seat bar and wheels for positioning the wheels to counter-balance the frame.

15. In a wheeled cultivator, the combination of a supporting frame, ground wheels sustaining the frame, cultivator beams pivotally connected to the frame, a seat bar pivotally mounted on the frame, beam counterbalancing mechanism connected with the seat bar, and mechanism for shifting the center of gravity of the frame, said latter mechanism being controlled in its action by the operation of the beam counter-balancing mechanism.

16. In a wheeled cultivator, the combination of a supporting frame, ground wheels mounted thereon, cultivator beams pivotally connected to the frame, a seat bar pivotally mounted on the frame, beam counter-balancing mechanism operatively connected with the seat bar, and mechanism for shifting the center of gravity of the machine, said latter mechanism being operatively connected with the seat bar.

17. In a wheeled cultivator, the combination of a supporting-frame having shiftable ground-wheels, cultivator-beams pivotally connected to said frame, a beam-counterbalancing seat-bar pivotally mounted on said frame, a bar-fulcrum member, a rock-shaft, a connection between said fulcrum-member and rock-shaft, and means connecting with and actuated by said rock-shaft to effect a change in the position of said wheels, and connections between said seat-bar and the cultivator beams whereby the latter are actuated by the seat-bar.

18. In a wheeled cultivator, the combination of a supporting-structure provided with shiftable ground-wheels, cultivator-beams pivotally connected to said supporting-structure, a beam-counterbalancing seat-bar pivotally mounted on said structure, a rock-shaft carried by said structure, connections between said shaft and said wheels, and means connecting with said rock-shaft and operated by said seat-bar to effect a positioning of said wheels.

19. In a wheeled cultivator, the combination of a supporting-frame provided with shiftable ground-wheels, cultivator-beams pivotally connected to said supporting-frame, a beam-counterbalancing seat-bar pivotally mounted on said frame, a rock-shaft sustained by said frame, means connecting said rock-shaft and seat-bar and operated by the latter to actuate said shaft, wheel-positioning members connecting with and operated by said rock-shaft, and means connecting with and operated by said seat-bar to position said cultivator-beams.

20. In a wheeled cultivator, the combination of a supporting-frame provided with shiftable ground-wheels, cultivator-beams pivotally connected to said supporting-frame, a beam-counterbalancing seat-bar pivotally mounted on said frame, a rock-shaft sustained by said frame, means connecting said rock-shaft and seat-bar and operated by the latter to actuate said shaft, wheel-positioning members connecting with and operated by said rock-shaft, means connecting with and operated by said seat-bar to position said cultivator-beams, and means for maintaining said rock-shaft in operative position and against movement by the cultivator-beam when encountering an uneven or rough surface.

21. In a wheeled-cultivator, the combination of a supporting-frame provided with shiftable ground-wheels, cultivator-beams pivotally connected to said frame, a seat-bar pivotally mounted on the frame, means connecting said beams and seat-bar and actuated by the latter to position the beams toward or away from the ground, a rock-shaft carried by the frame, means actuated by the seat-bar to rock said shaft, swinging arms carried by said shaft, and wheel-positioning-members connecting with said arms and operated thereby to position the wheels whereby said frame is moved according to the center of gravity as changed by the positioning of the beams.

22. In a wheeled cultivator, the combination of a supporting-frame provided with ground-wheels shiftable in the line of draft, cultivator-beams pivotally connected to said frame, a beam-counterbalancing seat-bar pivotally mounted on said frame, means connecting with said beams and operated by said seat-bar to position the beams, a rock-shaft rotatively mounted on said frame, means connecting said shaft to the seat-bar and operated thereby to rock the shaft, arms carried by said shaft, and wheels-positioning-members operated by said arms to force the ground-wheels forwardly or backwardly and thereby poise the supporting-frame according as the same has been positioned by the movement of the cultivator-beams.

23. In a wheeled cultivator, the combination of a supporting-frame provided with shiftable ground-wheels, cultivator-beams pivotally connected to said frame, a seat-bar pivotally mounted on said frame, means connecting with the beams and operated by the pivoted seat-bar to raise and lower the beams, and comprising a transverse rocking-member pivoted at the end of the seat-bar, and depending lifting-links attached to the beams, said rocking member being movable bodily by the seat-bar to position both beams simultaneously and, also, having an independent rocking movement to raise one beam and simultaneously lower the other, and wheel-positioning means connected to and operated by the seat-bar to shift the wheels in the line of draft.

24. In a wheeled cultivator, the combination of a supporting-frame provided with shiftable wheels, hangers depending from said frame, cultivator-beams pivoted to said hangers, a seat-bar pivotally mounted on the frame, a transverse balance-bar pivotally connected to and movable with said seat-bar, vertical suspending links connecting with said beams and balance-bar, and wheel-positioning means operated by said seat-bar to effect a shifting of the wheels in the line of draft.

25. In a wheeled cultivator, the combination of a supporting frame provided with shiftable ground wheels, cultivator beams pivotally connected to the frame, a counterbalancing seat member pivotally mounted on the frame, a fulcrum member connected with the seat member, wheel positioning members for shifting the wheels, swinging arms connected with said wheel positioning members, a transverse bar supported on the fulcrum member and operatively connected with the cultivator beams, a rock-shaft mounted on the supporting frame and operatively connected with the fulcrum member and with the swinging arms.

26. In a wheeled cultivator, the combination of a supporting frame, cultivator beam sustained thereby, shiftable ground wheels mounted on the frame, a counter-balancing seat member fulcrumed on the frame, a beam positioning mechanism, operative connections from the same to the seat member, a wheel positioning mechanism, and operative connections from the same to the seat member.

27. In a wheeled cultivator, the combination of a supporting-frame provided with shiftable ground-wheels, cultivator-beams pivotally connected to said frame, a counterbalancing seat-member fulcrumed on said frame, an oscillating fulcrum-member, bars jointed to said fulcrum-member and seat-member, and means connecting with the fulcrum-member and operated by said seat-bar for positioning said beams and for positioning said ground-wheels to correspond to the change in the center of gravity effected by the positioning of said beams.

28. In a wheeled cultivator, the combination of a supporting-axle provided with shiftable ground-wheels, a frame supported on said axle, cultivator-beams pivotally connected to said frame, a counterbalancing seat-bar fulcrumed on said axle, a pair of bars jointed to said seat-bar and to said axle, a fulcrum-member pivoted to said pair of bars, a rock-shaft rotatably mounted on said frame, a connection between said shaft and fulcrum-member, arms mounted on said shaft, and wheel-positioning connections between said arms and the ground-wheels.

29. In a wheeled cultivator, the combination of a supporting-axle provided with shiftable ground-wheels, a frame supported on said axle, cultivator-beams pivotally connected to said frame, a counterbalancing seat-bar fulcrumed on said axle, a pair of bars jointed to said seat-bar and to said axle, a fulcrum-member pivoted to said pair of bars, a rock-shaft rotatably mounted on said frame, a slidable connection between said shaft and fulcrum-member, arms mounted on said shaft, and wheel-positioning connections between said arms and the ground-wheels.

30. In a wheeled cultivator, the combination of a supporting-axle provided with shiftable ground-wheels, a frame supported on said axle, cultivator-beams pivotally connected to said frame, a counterbalancing a fulcrum-member pivoted to said pair of bars jointed to said seat-bar and to said axle, a fulcrum-member pivoted to said pair of bars, a rock-shaft rotatably mounted on said frame, a connection between said shaft and fulcrum-member, arms mounted on said shaft, wheel-positioning connections between said arms and the ground-wheels, and a balance-member fulcrumed on said fulcrum-member and connecting with the cultivator-beams.

31. In a wheeled cultivator, the combination of a supporting-axle provided with shiftable ground-wheels, a frame supported on said axle, cultivator-beams pivotally connected to said frame, a counterbalancing seat-bar fulcrumed on said axle, a pair of bars jointed to said seat-bar and to said axle, a fulcrum-member pivoted to said pair of bars, a rock-shaft rotatably mounted on said frame, a connection between said shaft and fulcrum-member, arms mounted on said shaft, wheel-positioning connections between said arms and the ground-wheels, and a balance-member fulcrumed on said fulcrum-member and connecting with the cultivator-beams, said beams being provided with a series of connecting points, with one or another of which the balance member engages.

32. In a wheeled cultivator, the combination of a supporting-axle provided with shiftable ground-wheels, a frame supported on said axle, angular hangers fixed to said frame, cultivator-beams fulcrumed on said hangers, a counterbalancing seat-bar fulcrumed on said axle, a balance-bar pivotally attached to said seat-bar, beam-lifting-members connecting with said balance-bar and attached to said beams at the rear of their fulcrums, and latching-members mounted on said frame and adapted to engage and hold one or both ends of said balance-bar and thereby sustain a beam or beams in a raised position.

33. In a wheeled cultivator, the combination of an axle-member having shiftable ground-wheels, a supporting-frame sustained by said axle, angular hangers depending from said frame, brackets carried by said frame, a rock-shaft rotatably mounted in said brackets, swinging arms carried by the ends of said shaft, wheel-positioning members jointed to said arms and connecting with the axle-member contiguous to the wheels thereon, cultivator-beams fulcrumed on said angular hangers, a fulcrum-member, a connection between said fulcrum-member and rock-shaft, a balance-bar pivoted on said fulcrum-member, beam-lifting members jointed to said balance-bar and connected to the beams at the rear of their pivotal connection with the hangers, a seat-bar fulcrumed intermediate of its length on the axle, and parallel bars jointed to the axle and to the fulcrum-member and to which the seat-bar is pivoted.

34. In a wheeled cultivator, the combination of an axle-member having shiftable ground-wheels, a supporting-frame sustained by said axle, angular hangers depending from said frame, brackets carried by said frame, a rock-shaft rotatably mounted in said brackets, swinging arms carried by the ends of said shaft, wheel-positioning members adjustably jointed to said arms and connecting with the axle-member contiguous to the wheels thereon, cultivator-beams fulcrumed on said angular hangers, a fulcrum-member, a connection between said fulcrum-member and rock-shaft, a balance-bar pivoted on said fulcrum-member, beam-lifting members adjustably jointed to said balance-bar and connected to the beams at the rear of their pivotal connection with the hangers, a seat-bar fulcrumed intermediate of its length on the axle, and connected with the fulcrum-member.

35. In a wheeled cultivator, the combination of an axle-member having shiftable ground-wheels, a supporting-frame sustained by said axle, angular hangers depending from said frame, brackets carried by said frame, a rock-shaft rotatably mounted in said brackets, swinging arms carried by the ends of said shaft, wheel-positioning members jointed to said arms and connecting with the axle-member contiguous to the wheels thereon, cultivator-beams fulcrumed on said angular hangers, a fulcrum-member, a connection between said fulcrum-member and rock-shaft, a balance-bar pivoted on said fulcrum-member, beam-lifting members jointed to said balance-bar and connected to the beams at the rear of their pivotal connection with the hangers, a seat-bar fulcrumed intermediate of its length on the axle, and connected to the fulcrum-member, and means independent of the seat-bar for elevating and depressing said beams.

36. In a wheeled cultivator, the combination of an axle-member having shiftable ground-wheels, a supporting-frame sustained by said axle, angular hangers depending from said frame, brackets carried by said frame, a rock-shaft rotatably mounted in said brackets, swinging arms carried by the ends of said shaft, wheel-positioning members jointed to said arms and connecting with the axle-member contiguous to the wheels thereon, cultivator-beams fulcrumed on said angular hangers, a fulcrum-member, a connection between said fulcrum-member and rock-shaft, a balance-bar pivoted on said fulcrum-member, beam-lifting members jointed to said balance-bar and connected to the beams at the rear of their pivotal connection with the hangers, a seat-bar fulcrumed intermediate of its length on the axle, and connected to the fulcrum-member, and handles and stirrups carried by said beams.

37. In a wheeled cultivator, the combination of an axle-member having shiftable ground-wheels, a supporting-frame sustained by said axle, angular hangers depending from said frame, brackets carried by said frame, a rock-shaft rotatably mounted in said brackets, swinging arms carried by the ends of said shaft, wheel-positioning members jointed to said arms and connecting with the axle-member contiguous to the wheels thereon, cultivator-beams fulcrumed on said angular hangers, a fulcrum-member, a connection between said fulcrum-member and rock-shaft, a balance-bar pivoted on said fulcrum-member, beam-lifting members jointed to said balance-bar and connected to the beams at the rear of their pivotal connection with the hangers, a seat-bar fulcrumed intermediate of its length on the axle, and connected to the fulcrum-member, and draft-devices connected to the supporting-frame and the hangers depending therefrom.

38. In a wheeled cultivator, the combination of a supporting-structure having shiftable ground-wheels, cultivator-beams, a counterbalancing seat-supporting bar, a balance-bar connected thereto, connections between said balance-bar and the cultivator-beams whereby said beams may be caused to balance each other and whereby the weight of the cultivator-beams and their attached plows may be counterbalanced by that of the driver, and wheel-positioning mechanism connected to and operated by said seat-bar whereby said wheels are positioned to balance the supporting structure when said beams are counterbalancing.

39. In a wheeled cultivator, the combination of a frame provided with shiftable ground wheels, cultivator beams mounted on the frame, a counter-balancing seat supporting bar fulcrumed on the frame and movable up and down when in operative position, a rocking member mounted on the frame, connections between the seat bar and rocking member for rocking the latter when the seat bar is in operative position, and wheel positioning members operatively connected with the rocking member.

40. In a wheeled cultivator, the combination of a frame provided with shiftable ground wheels, cultivator beams on the frame, a counter-balancing seat-supporting bar fulcrumed on the frame and movable up and down when in operative position, a rock-shaft mounted on the frame, operative connections between the rock-shaft and seat bar for rocking the shaft when the seat bar is in operative position, arms on the rock-shaft, and wheel positioning members connected with the arms.

41. In a wheeled cultivator, the combination of a frame, shiftable ground wheels thereon, cultivator beams on the frame, a counter-balancing seat supporting bar fulcrumed on the frame and movable up and down when in operative position, a rock-shaft mounted on the frame, an arm on the rock-shaft, a slip-joint connection between the seat bar and said arm for swinging the latter when the seat bar is in operative position, wheel positioning members and operative connections between the same and the rock-shaft.

42. In a cultivator, the combination, with a main frame, a cranked axle pivotally connected to said main frame, ground wheels carried by said axle, cultivator beams connected to the main frame and cultivating members carried thereby, of a rigid seat supporting member extending to the front and to the rear of said axle and movably mounted on said main frame at a point between its ends, a seat carried thereby, and means for operatively connecting said seat supporting member to said axle, whereby the movement of said seat supporting member will automatically adjust said axle relatively to the main frame.

43. In a cultivator, the combination, with a main frame, a cranked axle pivotally connected to said main frame, ground wheels carried by said axle, cultivator beams connected to the main frame and cultivating members carried thereby, of a seat supporting member movably mounted on said main frame, a seat carried thereby, and means for operatively connecting said supporting member to said axle and to said cultivator beams, whereby the movement of said seat supporting member will tend to adjust both the axle and the beams.

44. In a cultivator, the combination, with a main frame, a cranked axle pivotally connected to said main frame, ground wheels carried by said cranked axle, cultivator beams connected to the main frame and cultivating members carried by said beams, of a lever pivotally mounted on said main frame and extending to the front and to the rear of its point of support on said main frame, a seat secured to one end of said lever, and means for operatively connecting the other end of said lever, to said cranked axle, whereby the movement of said lever about its pivotal center will adjust said cranked axle relatively to said main frame.

45. In a cultivator, the combination, with a main frame, a cranked axle pivotally connected to said main frame, ground wheels carried by said cranked axle, cultivator beams connected to the main frame and cultivating members carried by said beams, of a lever pivotally mounted on said main frame, a seat secured to one end of said lever, and means for operatively connecting the other end of said lever to said axle and to said beams, whereby the movement of said lever will tend to adjust both the axle and the beams.

46. In a cultivator, the combination, with a main frame, a cranked axle pivotally connected to said main frame, ground wheels carried by said axle, cultivator beams connected to the main frame, cultivating members carried by said beams, a seat supporting member pivotally supported at a point between its ends on said main frame, and a seat carried by said member on one side of its pivotal support, of a rock shaft mounted on said main frame, an arm rigidly secured to said shaft and connected to said seat supporting member on that side of its pivotal support opposite said seat, a second arm rigidly secured to said shaft, and a rod connecting said second arm to said cranked axle, whereby the movement of said seat supporting member will impart movement to said cranked axle.

47. In a cultivator, the combination of a main frame, a cranked axle pivotally connected thereto, wheels carried by said axle, cultivator beams connected to the main frame, cultivating members carried by the beams, a seat supporting lever pivotally secured to the main frame, a seat on one end thereof, a transverse bar pivotally mounted on the other end of said lever, means connecting said bar and the cultivator beams, and means operated by the lever for imparting movement to the cranked axle.

48. In cultivators, the combination with the frame, of cultivator beams hung on said frame, an arched wheel axle having depending wheel sections swiveled to the frame and connected to said cultivator beams to shift therewith as the latter are raised and lowered, a counterbalancing seat-supporting bar pivoted between its ends on said frame and having a seat on its rear end, and connections between the forward end of said seat bar and said beams.

49. In a wheeled cultivator, a frame. wheel supporting means movably connected therewith, a cultivator beam movably supported by the frame, a counterbalancing seat bar movably mounted on the frame, means connecting the seat-bar and beam to impart movement to said beam and means simultaneously operated by the seat-bar for moving the frame and the wheel supporting means relative to each other.

In testimony whereof I hereunto set my hand this eighth day of June, 1909, in the presence of two attesting witnesses.

ALEXUS C. LINDGREN.

Witnesses:
CLYDE N. KING,
L. C. BLANDING.